(12) United States Patent
Ferguson et al.

(10) Patent No.: US 7,546,262 B1
(45) Date of Patent: Jun. 9, 2009

(54) SYSTEM AND METHOD FOR MANAGING DEBT COLLECTION USING CLUSTERING

(75) Inventors: Eric J. Ferguson, Phoenix, AZ (US); Ralph Concetto Rizza, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 591 days.

(21) Appl. No.: 10/907,194

(22) Filed: Mar. 24, 2005

(51) Int. Cl.
*G06Q 40/00* (2006.01)
(52) U.S. Cl. ....................................... 705/35
(58) Field of Classification Search ............. 705/35–40; 725/5; 708/1–3
See application file for complete search history.

(56) References Cited

U.S. PATENT DOCUMENTS

| | | | | |
|---|---|---|---|---|
| 6,098,052 | A * | 8/2000 | Kosiba et al. | 705/40 |
| 6,456,983 | B1 * | 9/2002 | Keyes et al. | 705/36 R |
| 7,191,150 | B1 * | 3/2007 | Shao et al. | 705/38 |
| 2003/0074290 | A1 * | 4/2003 | Clore | 705/35 |
| 2003/0078881 | A1 * | 4/2003 | Elliott et al. | 705/39 |
| 2004/0015425 | A1 * | 1/2004 | O'Neill | 705/35 |
| 2004/0044604 | A1 * | 3/2004 | O'Neil | 705/35 |
| 2005/0080821 | A1 * | 4/2005 | Breil et al. | 707/104.1 |

OTHER PUBLICATIONS

Kim, Jonathan Sungho, Ph.D., University of Pennsylvania, "Preference Heterogeneity and Buyer Segmentation in Conjoint-based Optimal Product Positioning Models", 1991. Abstract Only.*

* cited by examiner

*Primary Examiner*—Mary Cheung
(74) *Attorney, Agent, or Firm*—Moore & Van Allen, PLLC; Steven B. Phillips; Michael A. Springs

(57) ABSTRACT

System and method for managing debt collection using clustering. Debt collection treatment for a delinquent account can be determined in a reliable and consistent way by examining historical credit and demographic data for the debtor. In some embodiments, a plurality of behavior clusters within a multi-dimensional space for modeling debtor behavior are established using representative portfolio data. Result probabilities for various stimuli to be applied to the customer can be represented by a difference score, which indicates a difference in result flowing from the presence of particular stimuli versus the absence of the stimuli. The difference scores for the various stimuli, when normalized, can be used to assign the delinquent account to a cluster, which determines the treatment to be applied to the account.

18 Claims, 5 Drawing Sheets

(12) United States Patent
US 7,546,262 B1

SYSTEM AND METHOD FOR MANAGING DEBT COLLECTION USING CLUSTERING

CROSS-REFERENCE TO COMPUTER PROGRAM LISTING APPENDIX

A portion of the present disclosure is contained in a computer program listing appendix. The appendix contains an MS-DOS file entitled clustering.txt created on Mar. 14, 2005, of approximately 20 kilobytes. The contents of this file are incorporated herein by reference. Any references to "the appendix" or the like in this specification refer to this file.

The contents of this file are subject to copyright protection. The copyright owner has no objection to the reproduction by anyone of the patent document or the appendix as it appears in the Patent and Trademark Office patent files or records, but does not waive any other copyright rights by virtue of this patent application.

BACKGROUND

Loaning money is a central process in the banking industry. Banks and other creditor institutions depend on the repayment of various kinds of loans, with interest, for a significant portion of their revenue. Thus, when a debtor on a loan falls behind in his or her payments, a bank or other creditor institution typically has systems in place to flag the particular customer account in question as a delinquent account. For any given delinquent account, the creditor institution then faces a decision regarding what action to take. Such a determination is usually made with the aid of internal policies regarding treatments to be applied to particular types of accounts or customers, and involves judgment on the part of management or supervisory personnel. Often, these decisions are based on a relatively subjective understanding of the circumstances. Treatment of a delinquent account can include activities such as making collection calls to the customer, providing notice letters, and the like, with the goal of stimulating the customer to pay all or part of the money owed in order to minimize charge-off costs for the creditor. However, in a large institution with a large number of accounts, there are typically limits on how much of an individual customer's demographics and historical credit data can be considered in making treatment decisions.

SUMMARY

Embodiments of the present invention provide a system and method to determine a debt collection treatment for a delinquent account in a reliable and consistent way by taking into account historical credit and demographic data for the account customer. In some embodiments, a method of determining a debt collection treatment begins with establishing a plurality of behavior clusters within a multi-dimensional space for modeling debtor behavior using representative portfolio data. Each cluster from among the plurality of clusters can substantially correspond to a debtor characteristic or type of behavior. Result probabilities for various stimuli to be applied to the customer are determined based on historical data for the customer on the delinquent account. In at least some embodiments, these result probabilities are represented by a difference score, which indicates a difference in result flowing from the presence of particular stimuli versus the absence of the stimuli. The difference scores for the various stimuli, when normalized, can be used as dimensions to plot the delinquent account in a multi-dimensional space of behavior clusters. The delinquent account can then be assigned to a cluster, and the cluster determines the treatment to be applied to the account.

In some embodiments, the outcome probabilities used in determining difference scores reflect difference in charge-off, or a difference in payment. In some embodiments the various stimuli include: a live collection calls; a virtual call (VC); a higher than or lower than average call frequency; and offers to handle payments on-line or via the World Wide Web. In some embodiments, a cluster assignment is made by determining the smallest geometric distance to the centroid of a cluster. In some embodiments, call treatment is then applied to the account based on a decision tree which dictates a path of decision-making as determined by the assigned cluster for an account.

Systems and means for implementing the various elements and processes of the invention can be embodied in computer software instructions, various hardware platforms, databases, and connectivity to the various databases. In some embodiments, the clusters are defined only infrequently, while delinquent accounts are assigned to clusters for decision-making on an ongoing basis. The various difference scores are determined by a scoring engine, and a decisioning engine assigns each delinquent account to a cluster and implements a decision tree to recommend appropriate debt collection treatment. The clusters can be initially created with the help of portfolio data accumulated over time. The result probabilities which can be used to determine the difference scores can be calculated based on both historical credit bureau data and internal data for the debtor on the delinquent account. The various data can be accessed from the appropriate credit bureau systems and internal databases over a network and treatment recommendations can be delivered via the same or another network to a decisioning system or terminal.

DETAILED DESCRIPTION

Figure 1:
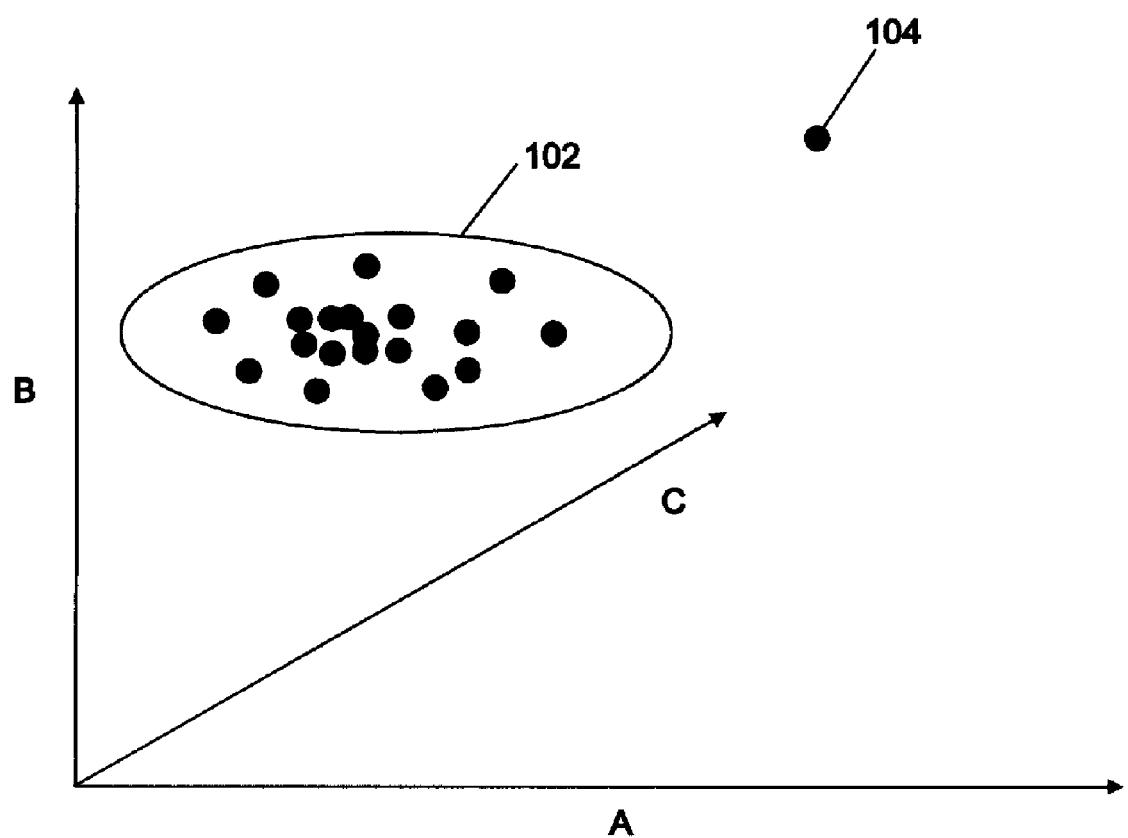
FIG. 1 is a simplified schematic illustration of clustering in order to define behavioral clusters according to at least some embodiments of the invention.

The present invention will now be described in terms of specific example embodiments. It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps. With respect to flowcharts, block diagrams, and flow diagrams, not every possible signal flow, data path or process block is shown. Rather, for clarity, only those important to the inventive concepts being discussed relative to the drawing may be illustrated, although others may be discussed.

As previously discussed, the invention relates to determining collection treatments to be applied to a customer with a delinquent account at a bank or similar lending institution. It should be understood that terms like "bank," "creditor," "institution," and the like are used herein in their broadest sense. Institutions, organizations, or even individuals that process loans are widely varied in their organization and structure. Terms like bank are intended to encompass all possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate multiple systems being used or accessed by a financial institution to perform some of the calculations and processes of the invention. These illustrations are examples only, and an institution or business can contract out portions of, or all of the invention. Conversely, an institution can implement all aspects of the invention on a single workstation if appropriate databases are present locally.

Reference will be made throughout this disclosure to "clustering" or to creating "clusters" in a multi-dimensional space. Clustering is a statistical technique that provides a mathematical means of grouping a population items into clusters of similar items. In the embodiments herein, clusters are defined by grouping customers or debtors of a bank into groups, wherein the customers in each group all exhibit similar behavior characteristics. Thus, the clusters of embodiments of the present invention can be referred to as behavior clusters.

To create a cluster, each account in a portfolio is assigned the appropriate values from the portfolio data for its various attributes. Raw variables are derived from the portfolio data, and used to plot the accounts to create clusters. Each point representing a customer or account is plotted in a multi-dimensional space, where each dimension represents one of the variables. FIG. 1 illustrates an example with just three variables for clarity. The three variables are designated "A," "B," and "C." When points representing customers are plotted according to their raw variables in the multi-dimensional space formed by axes representing A, B and C, the points will tend to form "clusters" in the geometric space. For example, points 102 in FIG. 1 represent a cluster of accounts. Accounts are assigned to a cluster using Euclidean distance calculations. The Appendix contains computer program code in the well-known "SAS" statistical programming language. For the clustering routine described herein, the raw variables are shown in the first block of code. The portfolio variables used to derive the raw variables are also shown in the code, and discussed in further detail below.

Once clusters are established within a mathematical model, the geometric distance of a new point to each of the cluster centroids is used to determine the cluster to which the new point is assigned. Typically, the nearest cluster, that is, the cluster with the minimum distance to the centroid is used. For example, point 104 of FIG. 1 might be included in the cluster represented by points 102. Alternatively, if the distance is less to another cluster, which is out of view given the scale of the graph in FIG. 1, point 104 might be included in the other cluster. The distance from each cluster centroid is the square root of the sum of the squared differences between the observation value and the cluster centroid for each clustering variable. The distances to every cluster centroid are compared to determine which cluster has the minimum distance from the observation and the observation or new point is assigned to a cluster with the minimum distances.

Figure 2:
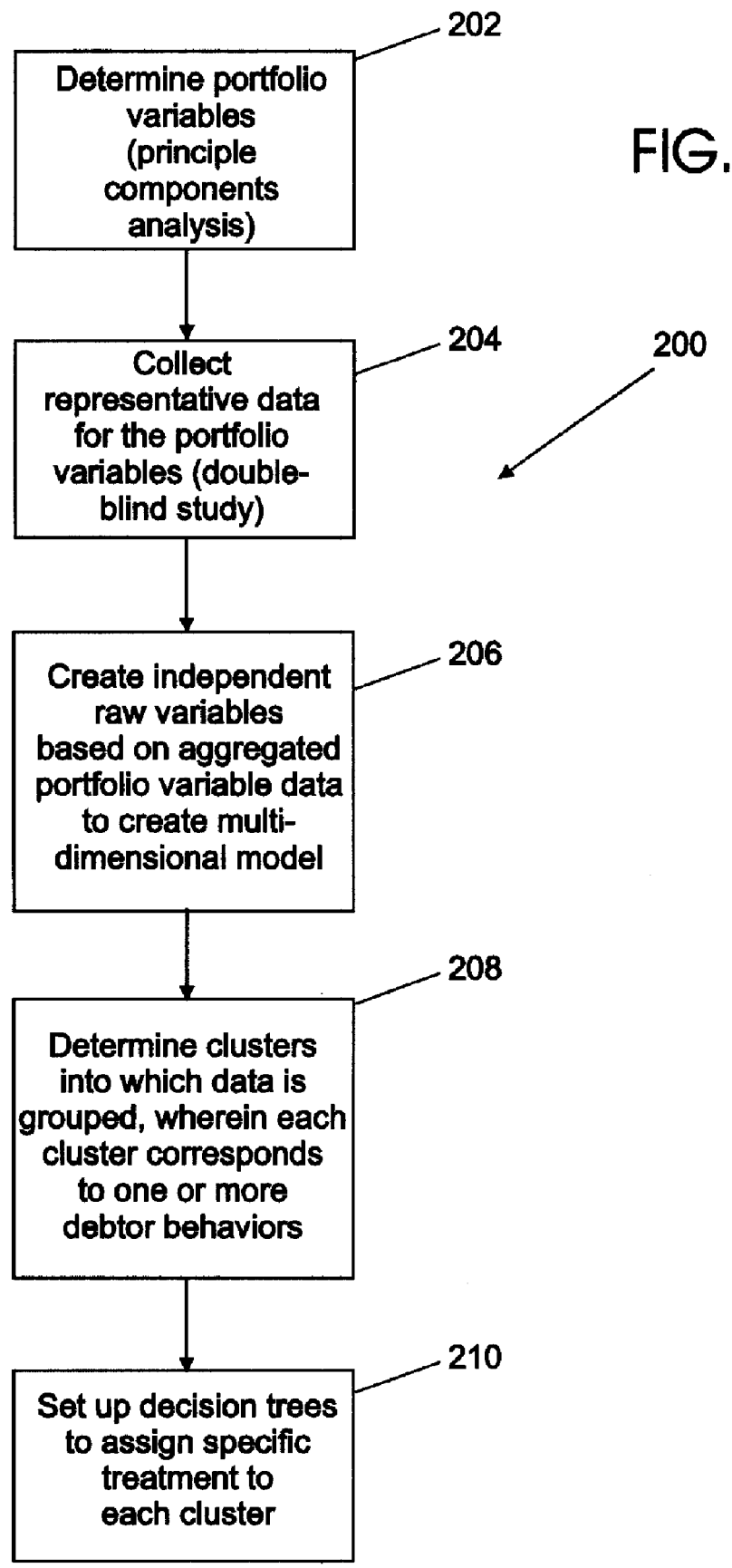
FIG. 2 is a flowchart that illustrates how clusters can be defined so that an assigned cluster determines a collection treatment for each account according to example embodiments of the invention.

FIG. 2 is a flowchart which illustrates the establishment of clusters according to an example embodiment of the present invention. Like most flowcharts, FIG. 2 illustrates the process as a series of sub-processes, elements, or process blocks. Process 200 begins with block 202, where the relevant portfolio variables are determined. These variables can be developed using principle components analysis to determine which variables are the most relevant to customer behavior. At block 204, representative data for the portfolio variables is collected. This data can be collected form credit bureaus, institutional databases of debtor history and demographic information, or any other source from which the relevant information can be gathered. In at least some embodiments, the data is collected as part of a double blind study.

Still referring to process 200 of FIG. 2, at block 206, independent raw variables are created using aggregated portfolio variable data. These independent raw variables are used to create a multi-dimensional model of customer behavior. The number of raw variables used should be the same as the number of dimensions that will be used to map newly delinquent accounts into the multi-dimensional space that defines the model. In example embodiments of the invention, the raw variables are differential dependent variables which are logarithmically related to the portfolio variables. At block 208, clusters are identified by plotting representative accounts from the portfolio in the statistical space defined by the model. The clusters that result from plotting the accounts can be examined, and a determination can be made as to which behavioral characteristics are shared by customers who fall into the various clusters. This determination can then be used to set up decision trees at block 210 of FIG. 2 which assign a specific course of collection treatment to an account which falls into a particular cluster.

The first portion of the source code in the Appendix is a statistical routine, written in the well-known SAS statistical programming language, which retrieves and merges data necessary to create the appropriate variables which define the clusters. The program also stores credit bureau data which has been used for the analysis in a file for future reference. For purposes of this exemplary embodiment, a portfolio of credit card accounts has been used. With respect to this portfolio, the portfolio variables which have been identified as a result of the principle components analysis are the historical average and the most recent of each of: purchase amount; payment amount; late charge; fee; and balance. The independent raw variables which define the dimensions of the model appear in the program listing as raw1, raw2, raw3, raw4.

Once clusters have been established, they can be used for some extended period of time. For example, an enterprise making use of an embodiment of the invention may find it advantageous to update the clusters in the model only once every quarter or once every year. It is also convenient to assign a name and profile to each cluster. One of skill in the art can assign names that help understand and explain the various types of customers and their behaviors, and how their behaviors impact collection activities of the enterprise. The clusters listed below, with their names and descriptive characteristics are an example of clusters used for a credit card portfolio. In this example embodiment, at least some of the characteristics attributed to some of the clusters are based on information gathered during the double-blind study, where various treatments have been tried on test and control groups of customers. Any names can be assigned to the clusters; the list below is exemplary only, though it may be helpful to use names that are descriptive of the characteristics of customers in the cluster. For example, the "new credit" cluster is exemplified by, among other traits, customers having many new accounts on file at the credit bureau.

New Credit—moderate call responsiveness, intensity does not impact, adverse to a virtual call (VC), moderately responsive to Web offers, medium low roll rates, low credit limits, high utilization, lowest payments, high number of revolving accounts, medium level of credit bureau delinquencies.

Do Not Disturb—slightly adverse to call activity, indifferent to intensity level, indifferent to VC, not responsive to Web offers, medium low roll rates, medium low credit limits, low utilization, high payments, low number of revolving accounts, low level of credit bureau delinquencies.

Web Savvy—indifferent to a call, intensity does not impact, VC not useful, highly responsive to Web offers, low roll rates, medium credit limits, low utilization, high payments, medium level of revolving accounts, low level of bureau delinquencies.

Virtual Preferred—moderately responsive to a call, medium intensity appropriate, highly responsive to VC, moderately responsive to Web offer, high roll rates, high credit limits, medium utilization, medium high payments, low number of revolving accounts, medium level of bureau delinquencies.

Call Sensitive—moderately responsive to a call, adverse to high intensity, moderately responsive to VC, low responsiveness to Web offer, medium roll rates, medium high credit limits, medium high utilization, fairly low payments, medium number of revolving accounts, low level of credit bureau delinquencies.

Repeat Offenders—highly responsive to a call, indifferent to intensity level, VC indifferent, low response to Web offer, high roll rates, low credit limits, highly utilized, low payments, medium number of revolving accounts, high level of bureau delinquencies.

High Intensity—responsive to a call, high intensity is appropriate, negative VC behavior, medium responsiveness to Web offer, high roll rates, medium credit limits, highly utilized, low payments, high number of revolving accounts, high level of bureau delinquencies.

Figure 3:
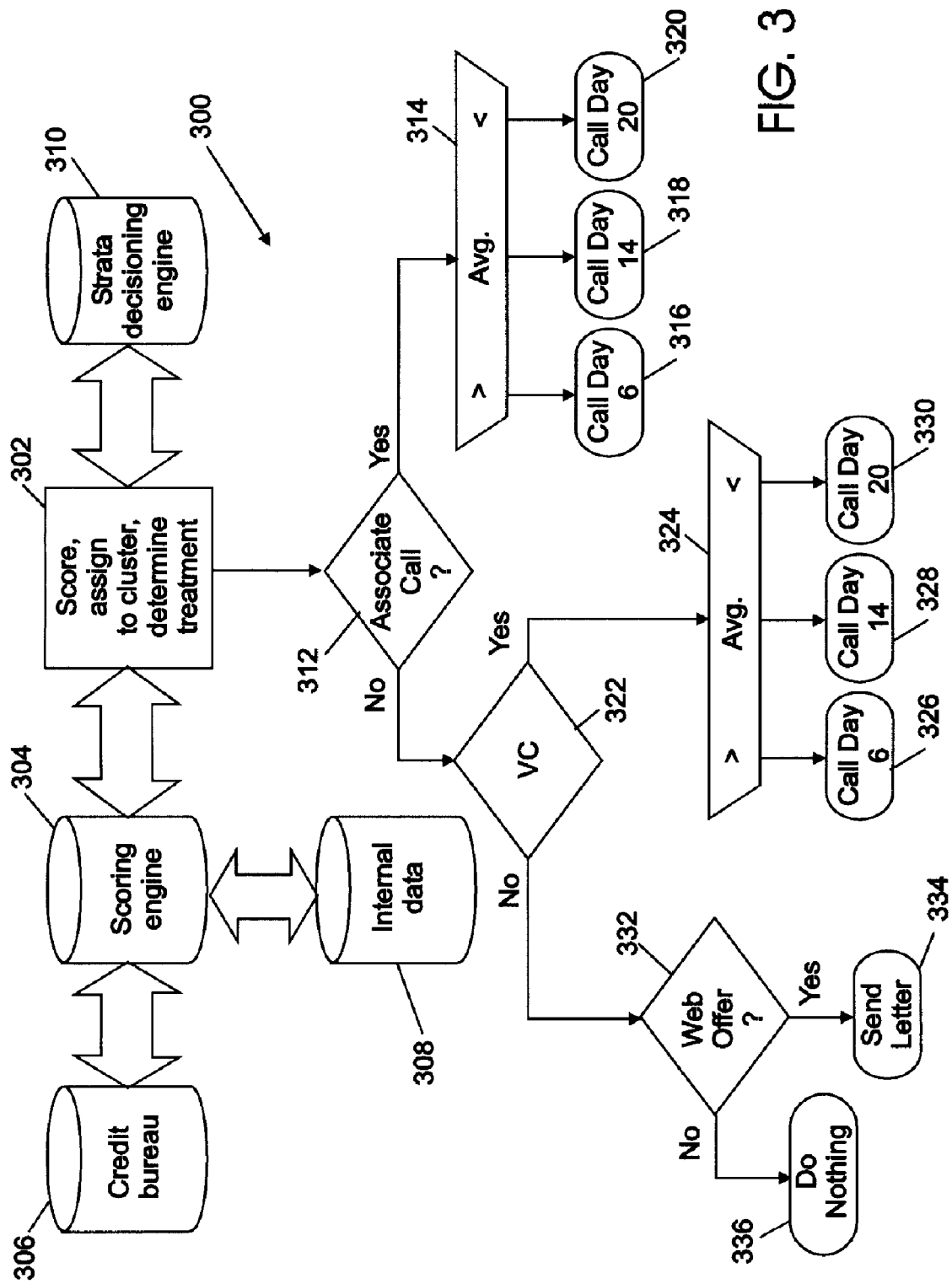
FIG. 3 is a flowchart that illustrates the overall decisioning process for delinquent accounts according to at least some example embodiments of the present invention.

FIG. 3 is a flowchart of an overall process, 300, that can be used in making day-to-day collection treatment decisions in a financial institution or a similar enterprise. In this particular exemplary embodiment, the process is being applied to so-called "bucket one" collections for credit card accounts. The term "bucket one" is used in banking industry parlance to refer to accounts which are delinquent for 30 days or less. It cannot be over emphasized that a process like process 300, as well as other processes and systems described herein, can be used for any type of account and any type of or amount of delinquency and collection treatment. Process 300 begins with subroutine 302 where a delinquent account is scored, assigned to a cluster, and a decision tree is initiated to establish a collection treatment for the account. In exemplary embodiments, scoring is accomplished through use of a scoring engine, 304, which accesses credit bureau databases 306 and internal account data 308. More details on the nature of the data obtained from these databases are discussed later with respect to FIG. 4. In exemplary embodiments, scoring engine 304 is a software routine that carries out calculations necessary to assign the delinquent account to a cluster. This process will be further described with reference to FIG. 4. Additionally, source code for a statistical process of defining the input and output files that can be used in the scoring is shown as the second block of source code in the Appendix.

Still referring to FIG. 3, subroutine 302 also makes use of decisioning engine 310. Decisioning engine 310 uses a decision tree assigned to a cluster to determine an appropriate collections treatment for an account. Decisioning engine 310 is accessed by subroutine 302 to initiate collections treatment recommendations. In exemplary embodiments, decisioning engine 310 can be implemented by a standard decisioning software product such as those marketed by Strata Decision Technology, LLC of Champagne, Ill., United States. The input and output files created by the second block of SAS source code contained in the Appendix are used to provide input to and collect output from Strata decision software.

Still referring to FIG. 3, the remainder of process 300 illustrates decision steps which are implemented by the decision trees in this exemplary embodiment of the invention. At block 312, a decision is made as to whether a human associate of the financial institution will make a collections call. The cluster to which the debtor has been assigned, and the behavior characteristics of debtors of that cluster will determine the outcome of decision block 312. For example, clustering of the account with the "do not disturb" customers and the "virtual preferred" customers in the example above would cause a decision not to make a live associate call. Conversely, the "repeat offenders" cluster or the "high intensity" cluster will result in a decision to make an associate call. If an associate collections call is to be made, processing proceeds to block 314, where call intensity is determined. Block 314 is a three way decision block in which a determination is made as to whether to call with an average intensity, a less than average intensity, or a greater than average intensity. A greater than average intensity decision results, in this example, in a call being made 6 days past the due date of on the delinquent account at block 316. An average intensity results in a call being made 14 days past the due date at block 318. A less than average call intensity preference results in a call at 20 days past the due date, as shown at block 320.

If a decision at block 312 of FIG. 3 is taken to not make an associate call, a decision is then made at block 322 as to whether to make a virtual call (VC). If virtual calls are to be made as decided at block 322, processing proceeds to block 324, where a call intensity decision is made. This three way decision block is essentially the same as that previously described. Again, processing at block 324 branches to a call at 6 days at block 326, a call at 14 days at block 328, and a call at 20 days at block 330. In general, the decision trees in this example embodiment are implemented to use the treatment to which a customer should best respond based on the cluster, and to minimize cost. For example, if a customer would respond equally well to a virtual call and a live call, the virtual call is selected since it can be made at lower cost. One of ordinary skill in the art can further engineer the decision trees to minimize charge-off, or expense, or to maximize return on investment. In some cases these engineering choices may involve selecting appropriate hold periods.

Still referring to FIG. 3, if no calls will be made as determined by decision blocks 312 and 322, a decision as to whether or not a Web or online offer will be made to the customer is made at block 332. If a Web offer is to be made, an appropriate letter is sent at block 334. Otherwise, a decision is made to do nothing at block 336.

It should be noted that a decision to do nothing may be in effect made earlier on in the process, if it is determined that the charge off avoided, or payment collected, will be less than the cost of implementing the collection treatment. The scoring calculations to be described with respect to FIG. 4 actually reflect these considerations in the determinations of result probabilities, which can be used to determine difference scores.

Figure 4:
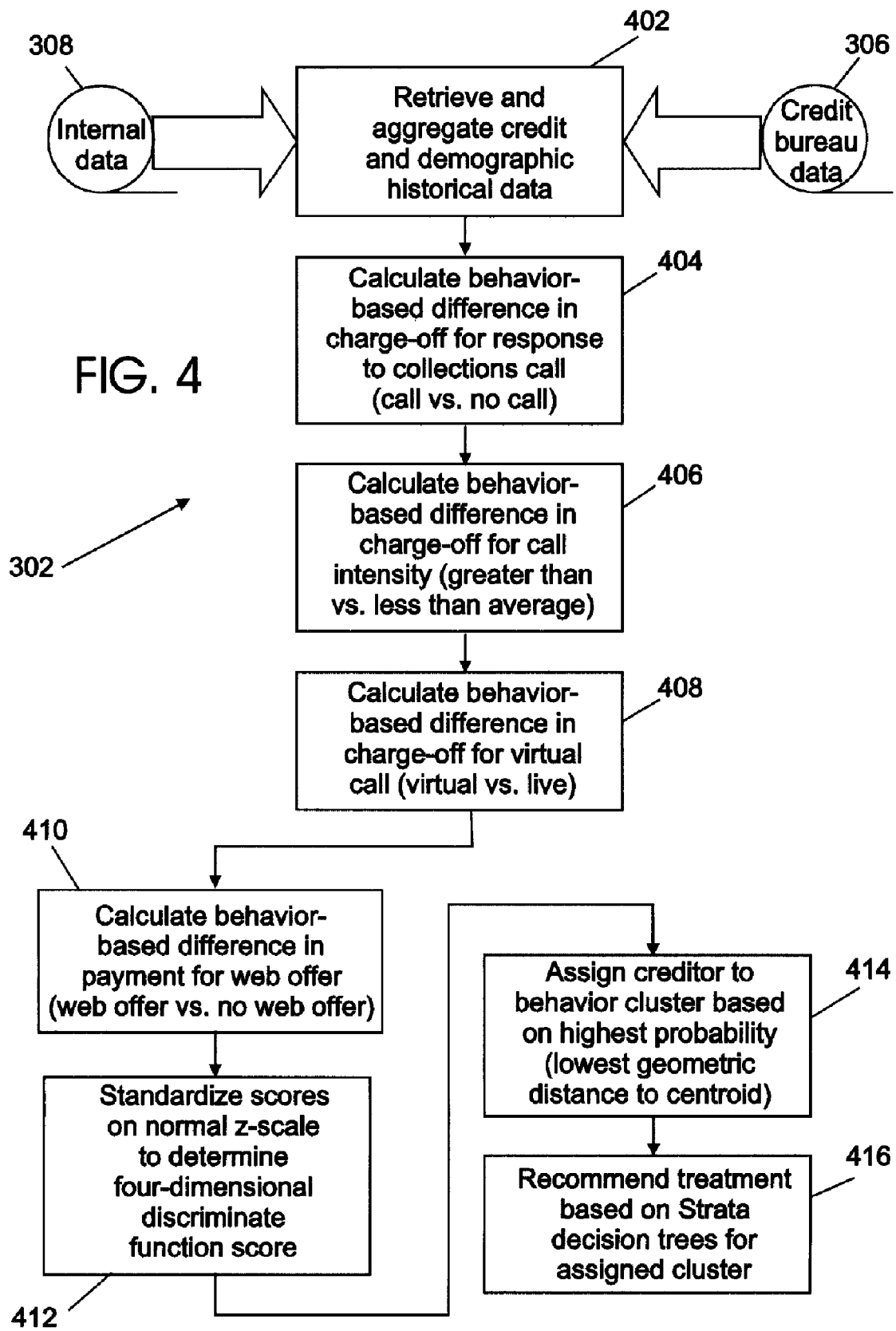
FIG. 4 is a more specific flowchart that illustrates the operation of the scoring engine according to at least one example embodiment of the invention.

FIG. 4 is a flowchart that illustrates further details of subroutine 302 of FIG. 3. Again, as is typical with flowcharts, the various elements of subroutine 302 are shown as process blocks. Subroutine 302 is an exemplary, "bucket one" scoring process, and makes use of credit bureau data 306 and internal account and demographic data 308. For convenience, this data is being shown as accessed only at one point in the scoring process. However, there may be some embodiments where this data is accessed continuously or at multiple points.

The bucket one collection scoring process entails three basic stages, the first of which involves the retrieval and aggregation of the necessary data. The second stage involves the calibration of the models that predict the behavior of customers under differing treatment scenarios, and the third stage assigns an account to a cluster based upon the calculated behavior dimensions.

Returning to FIG. 4, variables for the cluster assignment process are obtained and aggregated at block 402 from two sources. Credit bureau data 306 represents a snapshot of the general credit behavior exhibited by delinquent accounts and includes such elements as total revolving balances and credit utilization, number and type of charges and a customer's delinquency history. Internal account activity data 308 allows a creditor institution to observe historical customer behavior describing the specific use of their account or credit card. Information obtained from this internal database can include historical payments, delinquency trends, purchase and revolving habits.

Still referring to FIG. 4, stage two of scoring process 302 includes blocks 404, 406, 408, and 410. In each block calculations are carried out that calibrate the model for each account by determining the value of each dimension used to plot the account in the four-dimensional space. In exemplary embodiments of the invention described herein, some probabilities are expressed as a likelihood of a charge off. Others can be expressed as a likelihood of payment. One of ordinary skill in the art can design a system to express any of these or other probabilities and one way or the other, and achieve the same result.

At block 404 of FIG. 4, to predict the response to a collections call, the customer is scored for two separate scenarios. It is the probability of charge-off (the inverse of payment) under each of the scenarios that is calculated in this embodiment. This probability can be referred to herein as a "result" probability. Scenario one is based on payment behavior when the customer has received a collections call, and scenario two is based on payment behavior when the customer is withheld from collections contact. These two numerical scores are then compared for a delinquent account to determine under which scenario the customer will perform best. For example, if a customer has a 10% probability of making a constructive payment under scenario one (receive call), but only an 8% probability of constructive payment behavior under scenario two (does not receive call), this customer will be clustered so that the customer will be identified as one who should get a collections call. As previously mentioned, the probabilities in example embodiments are actually reflected as charge-off probabilities. The resulting behavior-based, mathematical difference between the result probabilities, which may be termed a "difference score," becomes an input dimension that will assign this account to a cluster.

At block 406 of FIG. 4, a similar calculation is performed based on call frequency or call intensity. It can be shown that the frequency of collections calls will tend to create different behavior for differing accounts and customers. Once again, each customer is scored for two separate scenarios and in this case, the scenarios are based on behavior when the customer receives a lower than average amount of collections call attempts vs. behavior when the customer is subjected to higher than average collections call effort. Again, the result probabilities of the two scenarios are subtracted to produce a difference score at block 406 of FIG. 4. This difference score becomes an input that is ultimately used to plot the account so that it can be assigned to a cluster.

Turning to block 408 of FIG. 4, the use of an automated calling system to make a virtual call (VC) to a delinquent account customer is evaluated. Automated calling as a collections treatment can be both cost effective and suitable for specific types of account holders who do not require the attention of a live collector. Similar to the preceding descriptions, each customer is scored for two separate scenarios to assess the probability of charge-off (or payment) under the differing treatments. In this case, scenario one is based on the customer receiving a conventional collections call using a live collector, and scenario two represents behavior when the customer is targeted with a VC treatment. Once again at block 408, the difference between these two result probabilities is calculated and becomes the difference score for this dimension of the clustering model.

Still referring to FIG. 4, the fourth and final dimension in the model of this exemplary embodiment is based on a delinquent debtor's receptiveness to managing their payment transactions on-line or through a Web page. In this case, result probabilities representing payment are determined based on whether or not the customer receives a Web offer, and the difference in these result probabilities becomes the difference score to be plotted against the fourth dimension in the multi-dimensional model space. Payment as opposed to charge off is used for this dimension because more definite clustering results when payment is used for result probabilities in this category. Note that payment is the inverse of charge-off since when a customer pays on a delinquent loan the amount is then not charged off.

At block 412 of FIG. 4 the scores gathered above are standardized on a normal-z scale to be able to accurately assign an account to an actionable cluster based on the dimensions delineated above. The calculation, for each customer, results in a four-dimensional discriminate function score. Each delinquent account is than assigned to a behavior-based collection cluster group at block 414 based on which discriminate function score returns the highest probability. In exemplary embodiments, this can be accomplished by determining the smallest geometric distance to the centroid of a cluster. Finally, a treatment recommendation is procured at block 416 using the Strata decision trees previously discussed.

It cannot be overemphasized that the detailed scoring subroutine of FIG. 4 is but an example only. A similar process can be designed in many ways without departing from the spirit and scope of the idea of the present invention. For example, more or less than four dimensions can be used to model customer behavior. Also, scenarios can take into account different behaviors than are represented here. For different credit products or types of customers, different treatments may need to be evaluated. The process can also be extended to other delinquency times and is not restricted to bucket one.

It should also be understood that decisions that relate to call intensity can be described in various ways. For example, a question can be asked as to whether a customer prefers lower than average call intensity, or whether the customer prefers higher than average call intensity. Since these two options are the converse of each other, the answer to either question effectively conveys the same information.

Figure 5:
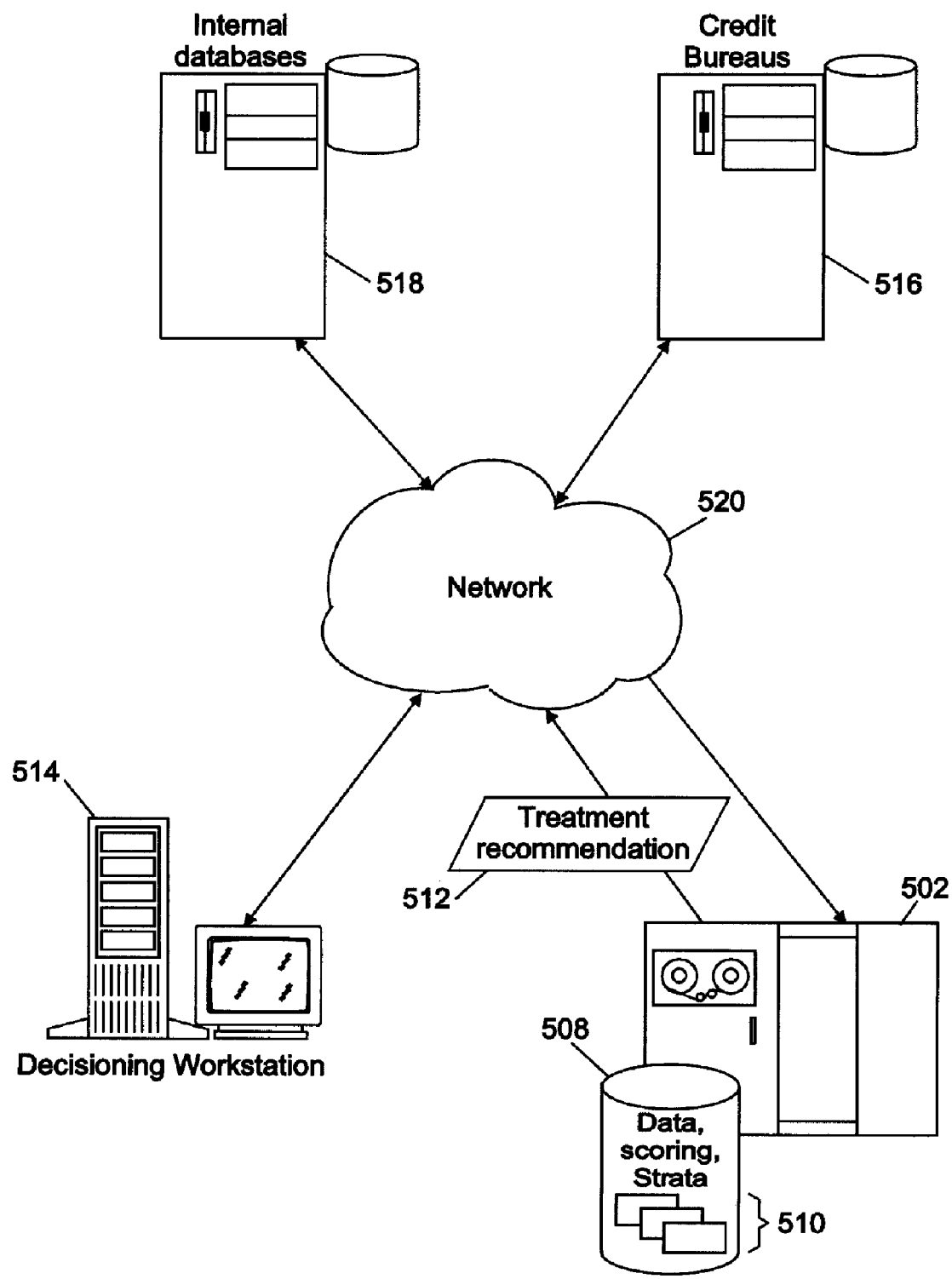
FIG. 5 is a system and network block diagram that illustrates the operating environment and equipment used in at least some example embodiments of the invention.

FIG. 5 is a block diagram illustrating one example operating environment for the present invention. Processing platform 502 can include one or more processors and a certain amount of memory. Such a processing platform typically has associated with it storage 508 for the appropriate data and computer programs or computer program code as shown at 510. In the example of FIG. 5, processing platform 502 and the affiliated storage and computer program code and data elements are used to aggregate and maintain historical data, demographic information, credit bureau data, etc. This processing platform can also direct the providing of a treatment recommendation, 512, to a decisioning system, which may be a user terminal or workstation such as workstation 514. These decisioning systems may reside, for example, at financial institution branches, management offices, or technical and operation centers. Decisioning systems may include customer service systems, collection systems and tracking systems.

In the example of FIG. 5, processing platform 502 can communicate with credit bureau systems 516 and internal account databases 518. Communication can take place over network 520, which may be via virtual private networking (VPN) or other encrypted connections over the Internet, or via private networking facilities. Treatment recommendations can also be sent to decisioning systems 514 via network 520.

As previously discussed, it should be noted that computer program code in the form of various computer program instructions can be used to implement at least portions of the processes involved in carrying out embodiments of the invention. Such computer program code can be supplied via a computer program product containing all or a portion of the computer program instructions stored on a medium. The media may be fixed, or removable. Such a medium is conceptually illustrated as a fixed storage media 508 of FIG. 5, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device. Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Specific embodiments of an invention are disclosed herein. One of ordinary skill in the computing and financial arts will quickly recognize that the invention has other applications in other environments. Many embodiments are possible. The following claims are not intended to limit the scope of the invention to the specific embodiments described above.

What is claimed is:

1. A method of determining a debt collection treatment for a customer on a delinquent account, the method comprising:

establishing, in storage associated with a processing platform, a plurality of clusters within a multi-dimensional space for modeling debtor behavior using representative portfolio data, wherein each cluster from among the plurality of clusters substantially corresponds to a debtor characteristic;

calculating, using the processing platform, result probabilities for various stimuli based on historical data for the customer;

calculating, using the processing platform, difference scores from the result probabilities, each difference score indicative of a difference in result flowing from the presence and absence of each of the various stimuli;

assigning, in the processing platform, using the difference scores, the delinquent account to the cluster based on probability as determined by geometric distance to a centroid of the cluster to indicate the debt collection treatment; and sending a recommendation of the debt collection treatment via a network.

2. The method of claim 1 wherein the difference in result describes a difference in at least one of a likely charge-off amount and a likely payment amount.

3. The method of claim 2 wherein the various stimuli are selected from a group consisting of a live collection call, a virtual collection call, a higher than average call frequency, an on-line offer, and combinations thereof.

4. The method of claim 3 wherein the assigning of the delinquent account comprises:

using, within the processing platform, each difference score as a dimension in the multi-dimensional space for plotting the delinquent account relative to the plurality of clusters.

5. The method of claim 1 wherein the various stimuli are selected from a group consisting of a live collection call, a virtual collection call, a higher than average call frequency, an on-line offer, and combinations thereof.

6. The method of claim 1 wherein the assigning of the delinquent account to the cluster comprises:

using, within the processing platform, each difference score as a dimension in the multi-dimensional space for plotting the delinquent account relative to the plurality of clusters.

7. A computer program product comprising a fixed or removable storage medium with computer readable program code embodied therein, the computer readable program code for execution by a processing platform to implement a method for determining a debt collection treatment for a customer on a delinquent account, the method comprising:

establishing, in storage associated with a processing platform, a plurality of clusters within a multi-dimensional space for modeling debtor behavior using representative portfolio data, wherein each cluster from among the plurality of clusters substantially corresponds to a debtor characteristic;

calculating, using the processing platform, result probabilities for various stimuli based on historical data for the customer;

calculating, using the processing platform, difference scores from the result probabilities, each difference score indicative of a difference in result flowing from the presence and absence of each of the various stimuli;

assigning, in the processing platform, using the difference scores, the delinquent account to the cluster based on probability as determined by geometric distance to a centroid of the cluster to indicate the debt collection treatment; and sending a recommendation of the debt collection treatment via a network.

8. The computer program product of claim 7 wherein the difference in result describes a difference in at least one of a likely charge-off amount and a likely payment amount and the various stimuli are selected from a group consisting of a live collection call, a virtual collection call, a higher than average call frequency, an on-line offer, and combinations thereof.

9. Apparatus for determining a debt collection treatment for each of a plurality of delinquent accounts, the apparatus comprising:
   means for collecting representative portfolio data;
   means establishing a plurality of clusters within a multi-dimensional space for modeling debtor behavior based on the representative portfolio data, wherein each cluster from among the plurality of clusters substantially corresponds to a debtor characteristic;
   means for calculating result probabilities for various stimuli based on historical data for the customer;
   means for calculating difference scores from the result probabilities, each difference score indicative of a difference in result flowing from the presence and absence of each of the various stimuli; and
   means for determining geometric distance to a centroid of the cluster to assign each delinquent account to the cluster to indicate the debt collection treatment.

10. The apparatus of claim 9 wherein the difference in result describes a difference in at least one of a likely charge-off amount and a likely payment amount.

11. The apparatus of claim 10 wherein the various stimuli are selected from a group consisting of a live collection call, a virtual collection call, a higher than average call frequency, an on-line offer, and combinations thereof.

12. The apparatus of claim 11 further comprising:
   means for using each difference score as a dimension in the multi-dimensional space for plotting the delinquent account relative to the plurality of clusters.

13. The apparatus of claim 9 wherein the various stimuli are selected from a group consisting of a live collection call, a virtual collection call, a higher than average call frequency, an on-line offer, and combinations thereof.

14. The apparatus of claim 9 further comprising:
   means for using each difference score as a dimension in the multi-dimensional space for plotting the delinquent account relative to the plurality of clusters.

15. A system for determining a debt collection treatment for each of a plurality of delinquent accounts, the system comprising:
   a network for acquiring representative portfolio data to establish a plurality of clusters for modeling debtor behavior, and for acquiring historical data for a customer on a delinquent account;
   a processing platform having computer program code executable thereon to implement a scoring engine to establish a plurality of clusters within a multi-dimensional space for modeling debtor behavior, wherein each cluster from among the plurality of clusters substantially corresponds to a debtor characteristic, to calculate result probabilities for various stimuli based on the historical data, and to calculate difference scores from the result probabilities, each difference score indicative of a difference in result flowing from the presence and absence of each of the various stimuli; and
   a decisioning workstation having computer program code executable thereon to implement a decisioning engine to assign the delinquent account to a cluster from among the plurality of clusters based on probability as determined by geometric distance to a centroid of the cluster, and to determine the debt collection treatment based on the cluster.

16. The system of claim 15 wherein the network is operable to receive at least one of the representative portfolio data and the historical data from both a credit bureau database and an internal database.

17. The system of claim 16 wherein the various stimuli are selected from a group consisting of a live collection call, a virtual collection call, a higher than average call frequency, an on-line offer, and combinations thereof.

18. The system of claim 15 wherein the various stimuli are selected from a group consisting of a live collection call, a virtual collection call, a higher than average call frequency, an on-line offer, and combinations thereof.

* * * * *